United States Patent [19]

Tsui et al.

[11] Patent Number: 5,187,485

[45] Date of Patent: Feb. 16, 1993

[54] PASSIVE RANGING THROUGH GLOBAL POSITIONING SYSTEM

[75] Inventors: James B. Y. Tsui, Dayton; Rudy L. Shaw, Huber Heights, both of Ohio

[73] Assignee: The United States of America as represented by the Secretary of the Air Force, Washington, D.C.

[21] Appl. No.: 879,016

[22] Filed: May 6, 1992

[51] Int. Cl.$^5$ .............................................. G01S 5/02
[52] U.S. Cl. .................................. 342/357; 342/126
[58] Field of Search ................. 342/13, 125, 126, 357, 342/453

[56] References Cited

U.S. PATENT DOCUMENTS

| | | | |
|---|---|---|---|
| 3,889,266 | 6/1975 | Bartram | 342/126 |
| 4,797,677 | 1/1989 | MacDoran et al. | 342/352 |
| 4,806,936 | 2/1989 | Williams et al. | 342/126 |
| 4,870,422 | 9/1989 | Counselmann, III | 342/357 |
| 4,894,662 | 1/1990 | Counselman | 342/357 |
| 5,043,736 | 8/1991 | Darnell et al. | 342/357 |
| 5,097,264 | 3/1992 | Takayama et al. | 342/453 |

OTHER PUBLICATIONS

Robert J. Milliken and Curt J. Zoller, Rockwell Int'l Corp. Space Div. Title, Principle of Operation of Navstar & System Characteristics Principles & Operational Aspects of Precision Position Determination Systems, Advisory Group for Aerospace Research & Development, pp. 4-1 to 4-12, Jul. 1979.
J. J. Spilker, Jr. "Global Pos. Sys.: Signal Structure & Perfm. Char." pp. 5-1 to 5-35.

*Primary Examiner*—Mark Hellner
*Attorney, Agent, or Firm*—Bernard E. Franz; Donald J. Singer

[57] ABSTRACT

To passively measure the range to a target, GPS signals which are scattered by the target are used to determine the distance from the target to an observation station whose position $P_o$ is determined by a GPS technique. If the delay time from the reflected signal of the target can be measured, the position $P_t$ of the target can be calculated. Four simultaneous nonlinear equations from the four satellites can be written as $$(x_t-x_i)^2+(y_t-y_i)^2+(z_t-z_i)^2 + (x_t-x_o)^2+(y_t-y_o)^2+(z_t-z_o)^2 = Ct_{ito}$$

where i=1, 2, 3, 4 represent the four satellites having positions, $P_i$, C is the speed of light, $t_{ito}$ is the time for the satellite signal travelling from the ith satellite to $P_t$ then to $P_o$. The trace of $P_t$ forms ellipsoidal surfaces with respect to $P_i$ and $P_o$. The point where the ellipsoidal surfaces intercept represents the position of the target. If only the distance between the target and observation station is of interest, this distance can be estimated easily. The distances from the target and the observation station to the satellite are about 20,000 km, whereas the distance $R_{ot}$ between the target and observation station is probably less than 100 km. Therefore the distance can be estimated as $$R_{ot} \approx C(t_{ito}-t_{io})$$

where $t_{io}$ is the time for the satellite signal to travel from satellite i to the observation point which is already known from the conventional GPS approach. In the above equation, only the reflection from one satellite is required.

3 Claims, 1 Drawing Sheet

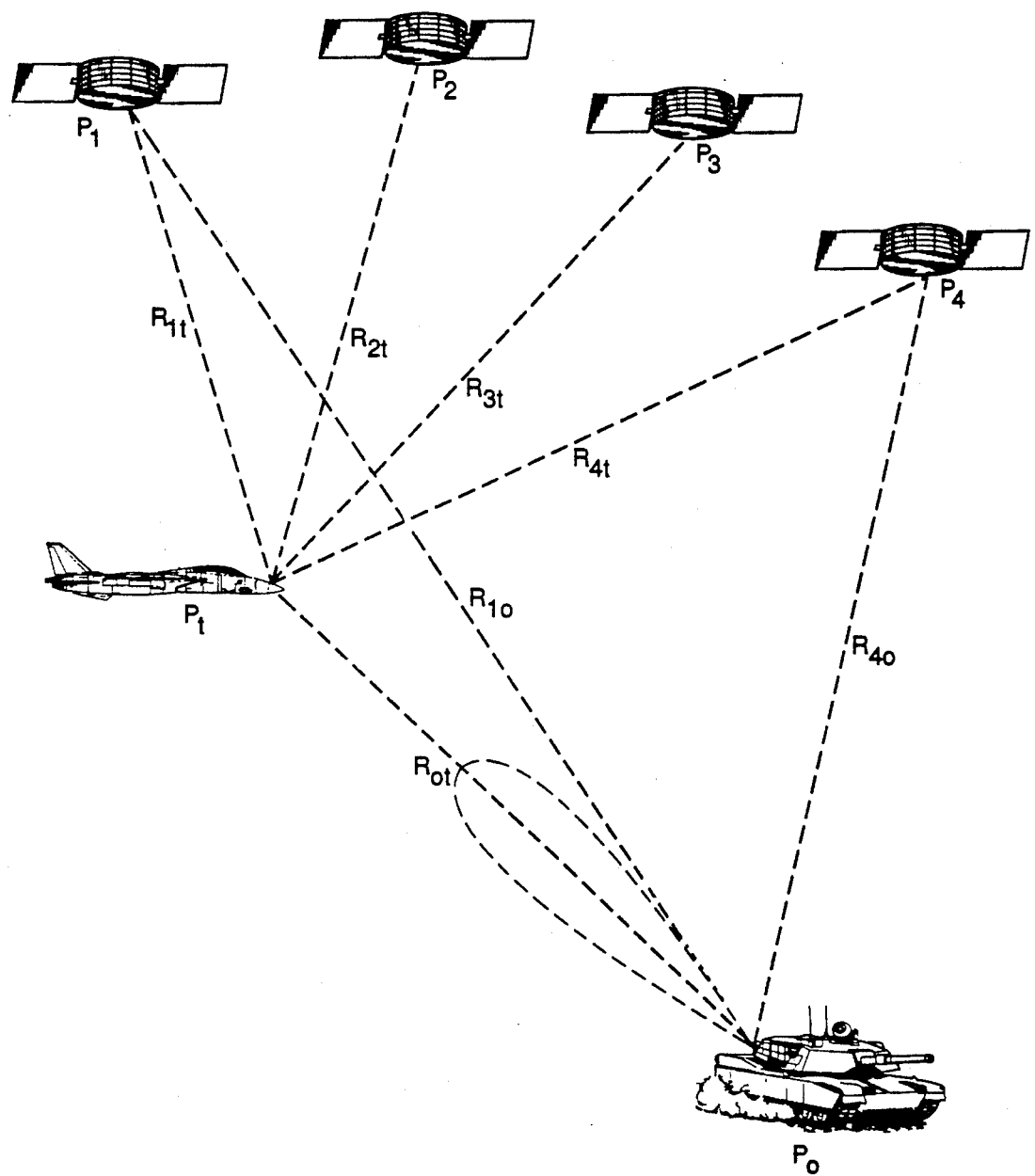

PASSIVE RANGING THROUGH GLOBAL POSITIONING SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a bistatic radar system which uses the Global Positioning System (GPS) satellites as radiation sources and uses GPS receivers, to passively measure the range to a target.

Passive ranging is critically needed information in military operations. Several decades of study on this technology provides very little new information. The conventional approach is to measure the Angle of Arrival (AOA) of the target when the target is intentionally emitting electromagnetic (EM) energy. The AOA information is measured at several positions along the flight path and a triangulation method is used to determine the range to the target. This approach requires very accurate AOA measurements and a relatively long time to obtain range accuracy.

The following U.S. patents relate to position locating systems utilizing the GPS.

U.S. Pat. No. 5,043,736—Darnell et al
U.S. Pat. No. 4,894,662—Counselman
U.S. Pat. No. 4,870,422—Counselman, III
U.S. Pat. No. 4,797,677—MacDoran et al In particular, the Darnell et al patent describes a positioning system which comprises a portable remote unit and a base information display unit. The remote unit includes a RF receiver circuit for use with a satellite navigation system, a microprocessor for analyzing coded signals, cellular phone modem circuits and a time of day clock. The base unit includes a computational system for decoding position data and a visual display device In operation, the remote unit microprocessor is used as the computational system that receives the output from a signal demodulator in the GPS receiver, and provides satellite range. This information is provided to a cellular phone modem for transmission to the base unit.

The Counselman '662 patent is directed to a method and system for determining position on a moving platform using signals transmitted by GPS satellites. In operation, a measurement of the platform's range to each satellite is made based upon the L1 (band signals) center frequency carrier phase. A correction for ionospheric effects is made, and the unknown basis in the L1 center frequency carrier phase range measurements is determined from simultaneous pseudorange measurement with time averaging. The instantaneous position of the platform may then be derived from the ranges so determined.

The Counselman III '422 patent relates to a method and system for measuring the baseline vector between a pair of survey marks on the ground by radio interferometry using radio signals broadcast from GPS satellites. In operation, an antenna is positioned at each survey mark, and the signals received by one antenna are separated into upper and lower sideband components. The components are filtered, converted to digital form, and multiplied together. The product is analyzed to determine the carrier wave that is implicit in the double-sideband signal being received from each satellite. The powers and carrier phases of the signals from a plurality of satellites are measured simultaneously, and numerical data representing the measurement results are obtained at each survey mark. The data from measurements at two survey marks are then processed together to determine the baseline vector that extends from one mark to the other.

The MacDoran et al patent describes a method and apparatus for deriving pseudo range from earth orbiting satellites. A modulated radio frequency signal transmitted from a satellite is intercepted at a user position. A fractional phase is derived from the measured phase and frequency of the signal. A Doppler range value is also derived from the measured frequencies of the satellites. The Doppler range value is divided by the wavelength of the given frequency to produce an integer and a remainder. The integer is added to the fractional phase to produce a value proportional to the pseudo range.

There are two papers on GPS published by AGARD in AGARDograph No. 245, "Principles and Operational Aspects of Precision Position Determination Systems", July 1979, one paper by R. J. Milliken and C. J. Zoller on "Principle of Operation of Navstar and System Characteristics" at pages 4-1 to 4-12, and another paper by J. J. Spilker, Jr. on "Global Positioning System: Signal Structure and Performance Characteristics" at pages 5-1 to 5-35. These two papers and the four patents are hereby incorporated by reference for a disclosure of the conventional GPS System and Operation.

SUMMARY OF THE INVENTION

An objective of the invention is to provide a method to passively measure the range to a target.

The method according to the invention uses GPS signals, which are scattered by a target, to determine the distance from the target to an observation station.

BRIEF DESCRIPTION OF THE DRAWING

The figure is a diagram of a system using the method according to the invention.

DETAILED DESCRIPTION

This approach uses the GPS satellites as radiation sources and a GPS receiver to form a bistatic radar system. In order to make this system workable, the AOA of the target must be measured first. This information can be obtained from a conventional electronic warfare (EW) receiver. Although the AOA can be measured, the distance from the receiver to the target is unknown. The intention of this invention is to find the distance between the target and the receiver.

The figure shows the satellites $P_1$, $P_2$, $P_3$ and $P_4$, where $P_t$ is the position of the target and $P_o$ is the position of the observation station. From conventional GPS, the power received at positions of $P_1$, $P_2$, $P_3$, $P_4$ and $P_o$ can be written as $$P_{si} = \frac{PG_s \sigma G_r \lambda^2}{(4\pi)^3 (R_{it} R_{ot})^2} \tag{1}$$

where P is the transmitting power from satellite, $G_s$ is the transmitting antenna gain from the satellite, $\sigma$ is the cross section of the target, $G_r$ is the antenna gain of the receiving antenna, $\lambda$ is the wavelength of the transmitted signal, $R_{it}$ is the distance from the target to the ith satellite, and $R_{ot}$ is the distance from the target to the observation point. In the above equation i=1, 2, 3, 4 and the transmitting power and gain of each satellite are assumed the same.

If the scattered energy by the target can be detected by the observer, the distance $R_{ot}$ can be calculated. However, the reflected energy from the target could be very weak. In order to receive this energy, two approaches can be considered. First, use a directional antenna to point at the target, since the direction of the target is known from an angle measurement. Second, use signal processing to improve the receiver gain, i.e. correlate with the p-code for a longer period of time than in conventional GPS signal processing.

If the delay time from the reflected signal of the target can be measured, the position of the target can be calculated. The four equations from the four satellites can be written as $$(x_t-x_i)^2+(y_t-y_i)^2+(z_t-z_i)^2+(x_t-x_o)^2 \\ +(y_t-y_o)^2+(z_t-z_o)^2=Ct_{ito} \qquad (2)$$

where i=1, 2, 3, 4 represent the four satellites; $x_t$, $y_t$, $z_t$, represent the location of the target t; $x_i$, $y_i$, $z_i$, represent the location of the ith satellite; $x_o$, $y_o$, $z_o$, represent the location of the observation point; C is the speed of light; and $t_{ito}$ is the time for the satellite signal travelling from the ith satellite to $P_t$ then to $P_o$. Equation (2) represents simultaneous nonlinear equations. The trace of $P_t$ forms ellipsoidal surfaces with respect to $P_i$ and $P_o$. The point where the ellipsoidal surfaces intercept represents the position of the target.

If only the distance between $P_t$ and $P_o$ is of interest, this distance can be estimated easily. The distances of $R_{it}$ and $R_{io}$ are about 20.000 km, where $R_{ot}$ is probably less than 100 km. Therefore the distance can be calculated from the law of cosines as $$R_{ot}^2 = R_{it}^2 + R_{ot}^2 - 2R_{it} \cdot 2R_{ot}\cos\theta \qquad (3)$$
$$\approx R_{it}^2 + R_{ot}^2 - 2R_{it} \cdot 2R_{ot} = (R_{it} - R_{ot})^2$$
$$\therefore R_{ot}^2 \approx R_{it} - R_{ot}$$
$$= C(t_{ito} - t_{io})$$

where $t_{io}$ is the time for the satellite signal to travel from satellite i to the observation point which is already known from the conventional GPS approach. This equation is an approximation because $R_{it} \approx R_{io} >> R_{ot}$, and $\theta \approx 0°$. In the above equation, only the reflection from one satellite is required.

In conclusion, solving for equation (2) provides the absolute position of the target and this approach needs four satellites. Solving for equation (3) only provides a distance, but only one satellite is needed.

This method can be applied to the radar as a electronic counter-counter measures (CC) technology. If a radar detects a target, it can turn off its transmitter and track the target Passively using satellites as the RF sources. Since the radar no longer transmits, it is very difficult, if not impossible, for an intercept receiver to detect its existence.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method for determining the distance from a target to an observation station, using four GPS satellites as radiation sources, and a GPS receiver at the observation station to form a bistatic radar system, wherein an angle of arrival (AOA) of the target to the observation station has been measured first, said method comprising:

measuring the respective delay times, $t_{1to}$, $t_{2to}$, $t_{3to}$ and $t_{4to}$, of signals travelling from the four satellites to the target and then to the observation station, the signals having been scattered by the target; and calculating the position of the target, using the following four equations which represent simultaneous nonlinear equations:

$$(x_t-x_1)^2+(y_t-y_1)^2+(z_t-z_1)^2+(x_t-x_o)^2 \\ +(y_t-y_o)^2+(z_t-z_o)^2=Ct_{1to}$$

$$(x_t-x_2)^2+(y_t-y_2)^2+(z_t-z_2)^2+(x_t-x_o)^2 \\ +(y_t-y_o)^2+(z_t-z_o)^2=Ct_{2to}$$

$$(x_t-x_3)^2+(y_t-y_3)^2+(z_t-z_3)^2+(x_t-x_o)^2 \\ +(y_t-y_o)^2+(z_t-z_o)^2=Ct_{3to}$$

$$(x_t-x_4)^2+(y_t-y_4)^2+(z_t-z_4)^2+(x_t-x_o)^2 \\ +(y_t-y_o)^2+(z_t-z_o)^2=Ct_{4to}$$

where C is the speed of light, $(x_1, y_1, z_1)$, $(x_2, y_2, z_2)$, $(x_3, y_3, z_3)$ and $(x_4, y_4, z_4)$ are respective positions of the four satellites, $(x_t, y_t, z_t)$ is the position of the target, and $(x_o, y_o, z_o)$ is the position of the observation station, wherein traces of the position of the target form ellipsoidal surfaces with respect to the positions of the satellites and the position of the observation station, and a point where the ellipsoidal surfaces intercept represents the position of the target.

2. The method according to claim 1, which includes pointing a directional antenna toward the target from the receiver at the observation station, using said angle-of-arrival information.

3. The method according to claim 1, which includes using signal processing to improve the receiver gain.

* * * * *